UNITED STATES PATENT OFFICE.

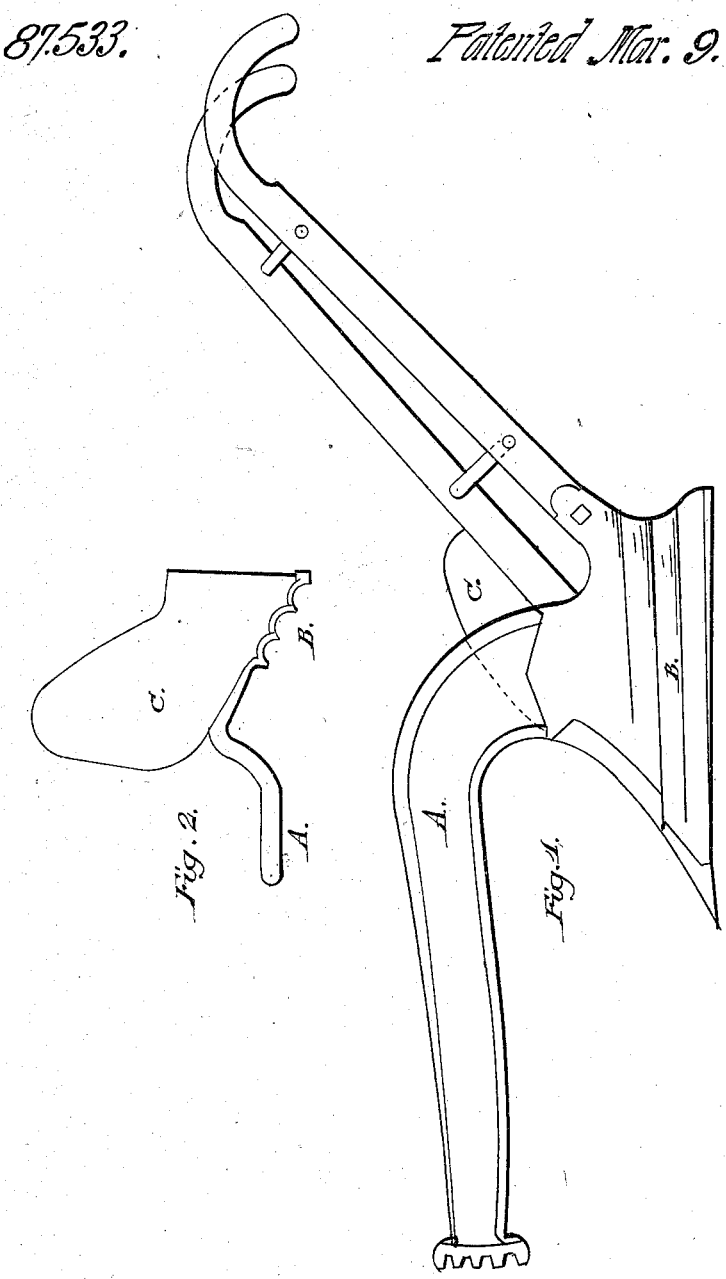

JAMES F. BENTON, OF PENN YAN, NEW YORK.

IMPROVEMENT IN PLOWS.

Specification forming part of Letters Patent No. 87,533, dated March 9, 1869.

*To all whom it may concern:*

Be it known that I, JAMES F. BENTON, of Penn Yan, in the county of Yates and State of New York, have invented a new and useful Improvement in Plows; and I do hereby declare that the following is a full, clear, and exact description of the construction and operation of the same, reference being had to the annexed drawings, making a part of this specification, in which—

Figure 1 is a land-side elevation. Fig. 2 is a rear view with the handles removed.

The letters of reference refer to the same parts in each figure.

The nature of my invention consists in making the land-side portions of a plow with longitudinal grooves or channels, for the purpose of causing the plow to run in a more direct line and pulverize the soil better; also, making the land-side portion of a plow incline away from the land, so that the plow will cut under the land, and allow that portion undermined to fall in the place of the plow as fast as the plow moves along, thus dropping the roots, weeds, stubble, or manure into the bottom of the furrow, so that the next furrow-slice will cover it up, and have soil free of roots, &c., to be thrown up to the surface, thus obviating the use of the fore or pointer plow.

To enable others skilled in the art to make and use my invention, I will proceed to describe its mode of construction and operation.

A is the plow-beam. It is made of cast-iron. The lower portion is made to correspond with the inclination of the land-side and mold-board. To the lowest part the land-side B is fastened in any ordinary method. That portion above the land-side that goes in the ground is grooved or channeled, as shown in the figures. The part joined with the mold-board is fitted within and partly behind the forward part of the mold-board, so that when the plow is drawn the union is more firmly drawn.

Above the mold-board the beam is curved, so as to make the forward end in the relative position to apply the team, so that the plow will run properly to turn the furrow-slice and pulverize the soil.

B is the land-side. It is made of iron or steel, and is securely fastened to the lowest part of the beam. The outer surface is grooved or channeled, as shown in Fig. 2.

The grooves are made to cause the plow to run in a direct line and allow the soil to hold the plow down; also, to loosen the soil, so that the edge left will crumble and fall into the bottom of the furrow behind the plow, so that when the next furrow-slice is turned it will turn over much loose soil, thereby mellowing all the soil removed by the plow.

C is the mold-board. It is made of iron or steel. The size, shape, and curve may be varied to suit the various kinds of soil or fancy of the plowman. The forward part is made to partly surround the beam, as shown in Fig. 1, and form a cutting-edge. This part is inclined any number of degrees to cause the plow to cut under the land, for the purpose of cutting out soil that is free from roots, weeds, or manure, to be thrown to the surface, so that whatever it is desirable to be covered with pure soil will be effectually done, thus doing away with the use of the fore-plow when plowing sward or stubble-ground.

The plowshare is fastened to the lowest part of the forward end in any ordinary manner. That portion of the plowshare that comes up along the forward edge must have the same inclination as the mold-board.

Having thus fully described my invention, what I claim as new, and desire to secure by Letters Patent, is—

The grooved or channeled land-side B, in combination with the mold-board C, when made and arranged as specified, and used in connection with the beam A, substantially as and for the purpose herein set forth.

JAS. F. BENTON.

Witnesses:
 JOHN L. LEWIS,
 CHARLES KETCHUM.